(12) United States Patent
Jian

(10) Patent No.: US 7,784,816 B2
(45) Date of Patent: Aug. 31, 2010

(54) FLAT PLATFORM CART WITH COLLAPSIBLE CASTERS

(76) Inventor: Shikun Jian, Shunhe Industrial Co., Ltd, Beside 325 National Highway, Tantang Zhou, Jiangcheng District Chengxi, Yangjiang City, Guangdong Province (CN) 529500

( * ) Notice: Subject to any disclaimer, the term of this patent is extended or adjusted under 35 U.S.C. 154(b) by 42 days.

(21) Appl. No.: 12/209,219

(22) Filed: Sep. 12, 2008

(65) Prior Publication Data

US 2010/0066057 A1  Mar. 18, 2010

(51) Int. Cl.
*B62B 3/02* (2006.01)
(52) U.S. Cl. .......................................... 280/651; 280/38
(58) Field of Classification Search ................. 280/38, 280/651, 652, 654, 655, 655.1, 47.371, 47.34
See application file for complete search history.

(56) References Cited

U.S. PATENT DOCUMENTS

| | | | | |
|---|---|---|---|---|
| 2,587,688 A * | 3/1952 | Bosk | ............................ | 280/39 |
| 3,400,942 A * | 9/1968 | Hull | ............................ | 280/39 |
| 4,274,644 A * | 6/1981 | Taylor | ......................... | 280/39 |
| 4,659,096 A * | 4/1987 | Leimgruber | ................. | 280/39 |
| 4,917,392 A * | 4/1990 | Ambasz | ....................... | 280/40 |
| 4,969,660 A * | 11/1990 | Spak | ........................... | 280/646 |
| 4,989,889 A * | 2/1991 | Server Perez | ................. | 280/40 |
| 4,993,727 A * | 2/1991 | vom Braucke et al. | ........ | 280/40 |
| 5,072,958 A * | 12/1991 | Young | ......................... | 280/40 |
| 5,263,727 A * | 11/1993 | Libit et al. | .................... | 280/40 |
| 5,285,656 A * | 2/1994 | Peters | ........................ | 62/457.1 |
| 5,312,006 A * | 5/1994 | Lag | .............................. | 211/195 |
| 5,348,325 A * | 9/1994 | Abrams | ........................ | 280/40 |
| 5,403,022 A * | 4/1995 | Snider | .......................... | 280/30 |
| 5,423,195 A * | 6/1995 | Peters | ........................ | 62/457.7 |
| 5,468,005 A * | 11/1995 | Yang | ............................. | 280/40 |
| 5,630,601 A * | 5/1997 | vom Braucke et al. | ........ | 280/40 |
| 5,772,222 A * | 6/1998 | Sim et al. | ..................... | 280/30 |
| 5,803,471 A * | 9/1998 | DeMars et al. | ................ | 280/40 |
| 5,984,327 A * | 11/1999 | Hsieh et al. | .............. | 280/47.24 |
| 6,053,514 A * | 4/2000 | Su | ............................... | 280/40 |
| 6,607,207 B2 * | 8/2003 | Shapiro et al. | ............. | 280/287 |
| RE38,436 E * | 2/2004 | Su | ............................... | 280/40 |
| 6,733,026 B1 * | 5/2004 | Robberson et al. | ....... | 280/415.1 |
| 6,845,991 B1 * | 1/2005 | Ritucci et al. | ................. | 280/30 |
| 7,066,485 B2 * | 6/2006 | Shapiro | ....................... | 280/651 |
| 7,118,115 B2 * | 10/2006 | Abel | ........................ | 280/43.13 |
| 7,140,635 B2 * | 11/2006 | Johnson et al. | ............. | 280/646 |
| 7,264,265 B2 * | 9/2007 | Shapiro | ....................... | 280/643 |
| 7,360,783 B2 * | 4/2008 | Home | ......................... | 280/639 |

\* cited by examiner

*Primary Examiner*—Jeffrey J Restifo

(57) ABSTRACT

A flat platform cart with collapsible casters which is stable in positioning and convenient in collapsing and use. It comprises a supporting section, a push-pull section and a caster section connected thereto by a linkage means, and an extension positioning means which enables the push-pull section and the caster section to be maintained in an extending state; the extension positioning means comprises a vertical positioning means which simultaneously locks the push-pull section and the caster section in position and a horizontal positioning means disposed between the load supporting platform and the supporting bases which horizontally locks the push-pull section in position. When the flat platform cart is extended, horizontal and vertical positioning are simultaneously being carried out, therefore the positioning is very stable and it is convenient for use.

9 Claims, 14 Drawing Sheets

FLAT PLATFORM CART WITH COLLAPSIBLE CASTERS

BACKGROUND OF THE INVENTION

The present invention relates to an effort saving flat platform cart device and more particularly pertains to an improved flat platform cart with collapsible casters which is convenient to collapse and use and capable of carrying heavy things.

At airports, piers, stations and warehouses, when people are required to move heavier luggage or things, they mostly use flat platform carts which are relatively effort saving and convenient. My China patent application 200710146724.7 has disclosed a flat platform cart with collapsible casters and a caster positioning means thereof which is convenient to collapse and use and capable of carrying heavy things. It comprises a load supporting platform, a push-pull section and casters, the ends of two supporting bars of the push-pull section are pivotally connected with a supporting frame, the caster sleeves on top of the casters are engaged onto the supporting frame, a caster extending, collapsing and linkage means is disposed between the caster sleeves and the supporting bars. The caster positioning means comprises a left and a right locking means which lock the caster sleeves on two side arms of the supporting frame with the supporting bars respectively, and a sliding cross bar which jointly moves with the left and the right locking means. The casters of the flat platform cart can be jointly moved with the push-pull section; when the push-pull section is folded up, the casters can be simultaneously and automatically collapsed to facilitate storage and transportation. However, as the caster positioning means merely fixes the push-pull section vertically relative to the supporting frame but not horizontally, the push-pull section sways forward and rearward relative to the supporting frame and thereby causing inconvenience in use.

BRIEF SUMMARY OF THE INVENTION

An object of the present invention is to provide a flat platform cart with collapsible casters in which the push-pull section is reliably secured relative to the supporting frame and the casters by means of improving the extension positioning means between the push-pull section and the caster section.

A further object of the present invention is to provide a new locking means disposed between the push-pull section and the load supporting platform.

The present invention adopts the following technical proposal:

A flat platform cart with collapsible casters, comprising a supporting section, a push-pull section and a caster section connected thereto by a linkage means, and an extension positioning means which enables the push-pull section and the caster section to be maintained in an extending state, wherein the supporting section comprises a supporting frame, supporting bases and a load supporting platform which are interconnected together, the push-pull section has two supporting bars which are hinged onto the supporting bases respectively by means of a base bracket; the caster section comprises casters, connecting bars each connecting two or more casters and caster sleeves, the caster sleeves are engaged onto the supporting frame, the extension positioning means comprises a vertical positioning means which simultaneously locks the push-pull section and the caster section in position and a horizontal positioning means disposed between the load supporting platform and the supporting bases which horizontally locks the push-pull section in position.

The horizontal positioning means comprises locking pins which are horizontally slidable and disposed between the two supporting bars, each supporting bar and/or base bracket is disposed with a locking aperture which corresponds to a first end of the locking pin, each locking pin is connected to a knob which drives the locking pin to slide. A spring coaxial or in parallel to the locking pin is disposed at a second end of each of the locking pins, and an end of the spring is connected with the load supporting platform. A sliding plate parallel to the locking pin is disposed above each locking pin, the sliding plates are respectively connected with the knobs of the locking pins, each sliding plate is disposed with a keyhole formed by a circular hole in communication with an elongated hole, the load supporting platform is disposed with press buttons each having a circular base at positions corresponding to the keyholes, each press button has an upper end which protrudes from an upper end face of the load supporting platform, each press button is disposed with a reset spring at an underside thereof; the circular holes of the keyholes and the circular bases of the press buttons have substantially identical diameters, widths of the elongated holes and diameters of the press buttons correspond with each other.

The vertical positioning means comprises a left and a right connecting means which are disposed at a rear end of the load supporting platform and correspond to the two supporting bars respectively, each of the left and the right connecting means is disposed with an upper latching pin and a lower latching pin which are in parallel to each other, the two supporting bars and/or the base brackets are respectively disposed with positioning apertures corresponding to the upper latching pins, the lower latching pins are in rectangular shape, the connecting bars of the caster section each has an inner wall which correspond to the lower latching pin, the lower latching pins are latched into the connecting bars of the caster section after passing through rectangular apertures of the supporting bases respectively. Each base bracket is disposed with a curved connecting transition face between a lower end face and a rear end face thereof, the base brackets are each connected onto the respective supporting bases by means of an axle, when the upper latching pins are disengaged from the positioning apertures on the supporting bars and the base brackets, and the push-pull section is set to pivotally rotate around the axles, the transition faces of the base brackets push the connecting means rearward and thereby maintaining the vertical positioning means in an unlocking state.

To sum up the above-mentioned, the advantageous effects of the present invention in comparison with the prior art are:

Firstly, the extension positioning means between the push-pull section and the caster section of the flat platform cart comprises both a vertical positioning means and a horizontal positioning means, thus the push-pull section would not sway forward and rearward when in use.

Secondly, the horizontal positioning means are additionally disposed with press buttons and sliding plates, when the press buttons are pressed down, the knobs can be pushed to disenable the locking of the horizontal positioning means; when the locking pins are inserted into the corresponding locking apertures, the horizontal positioning means is locked in position, the pressed buttons are thus engaged into the circular holes of the sliding plates and thereby preventing the said means from accidentally being extended.

Thirdly, the base brackets on the supporting bars are disposed with curved transition faces, therefore, in the process of rotationally collapsing of the push-pull section towards the load supporting platform, the connecting means of the vertical positioning means can be pushed rearward, thereby maintaining the vertical positioning means in an unlocking state.

Fourthly, by skillfully utilize lock knobs disposed on the cross bar for the extension and retraction of the push-pull section and providing locking slots on the load supporting platform, the lock hooks on the lock knobs correspond with the locking slots to maintain the push-pull section and the load supporting platform in a locked state, thereby enabling the flat platform cart to become a stably connected body after it is collapsed.

DETAILED DESCRIPTION OF THE INVENTION

Figure 1:
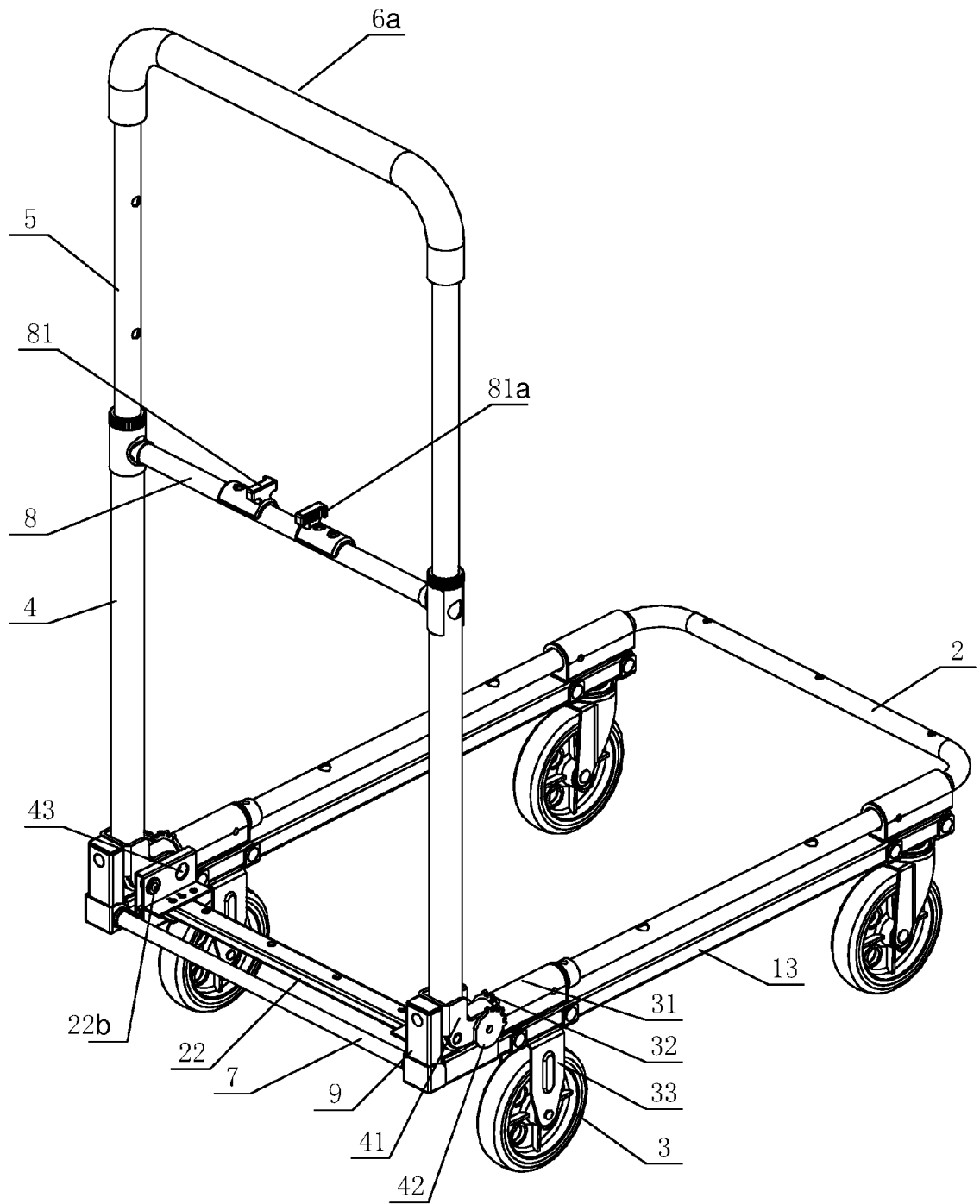
FIG. 1 is a perspective view of the flat platform cart with collapsible casters (excluding the load supporting platform).
Figure 2:
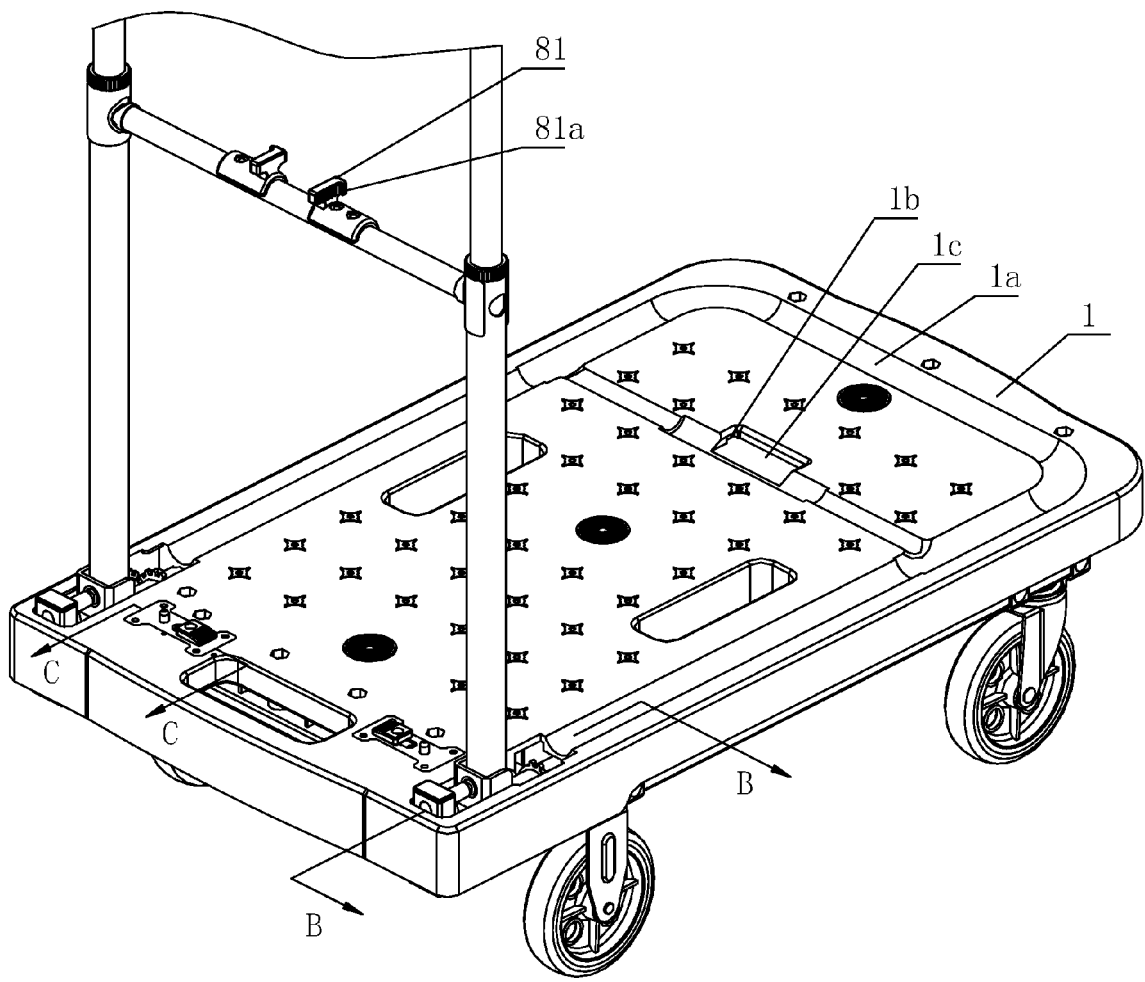
FIG. 2 is a perspective view of the flat platform cart with collapsible casters in FIG. 1 (including the load supporting platform).
Figure 3:
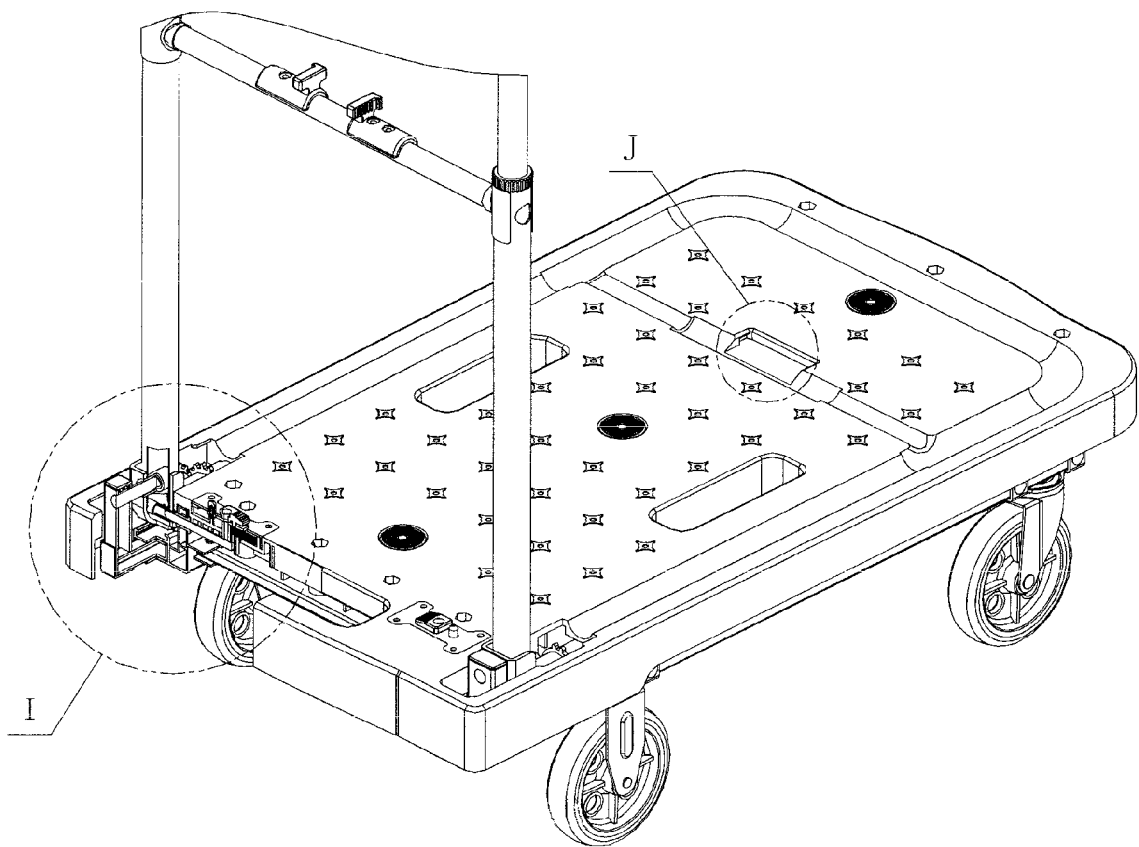
FIG. 3 is a partial perspective sectional view of FIG. 2.
Figure 22:
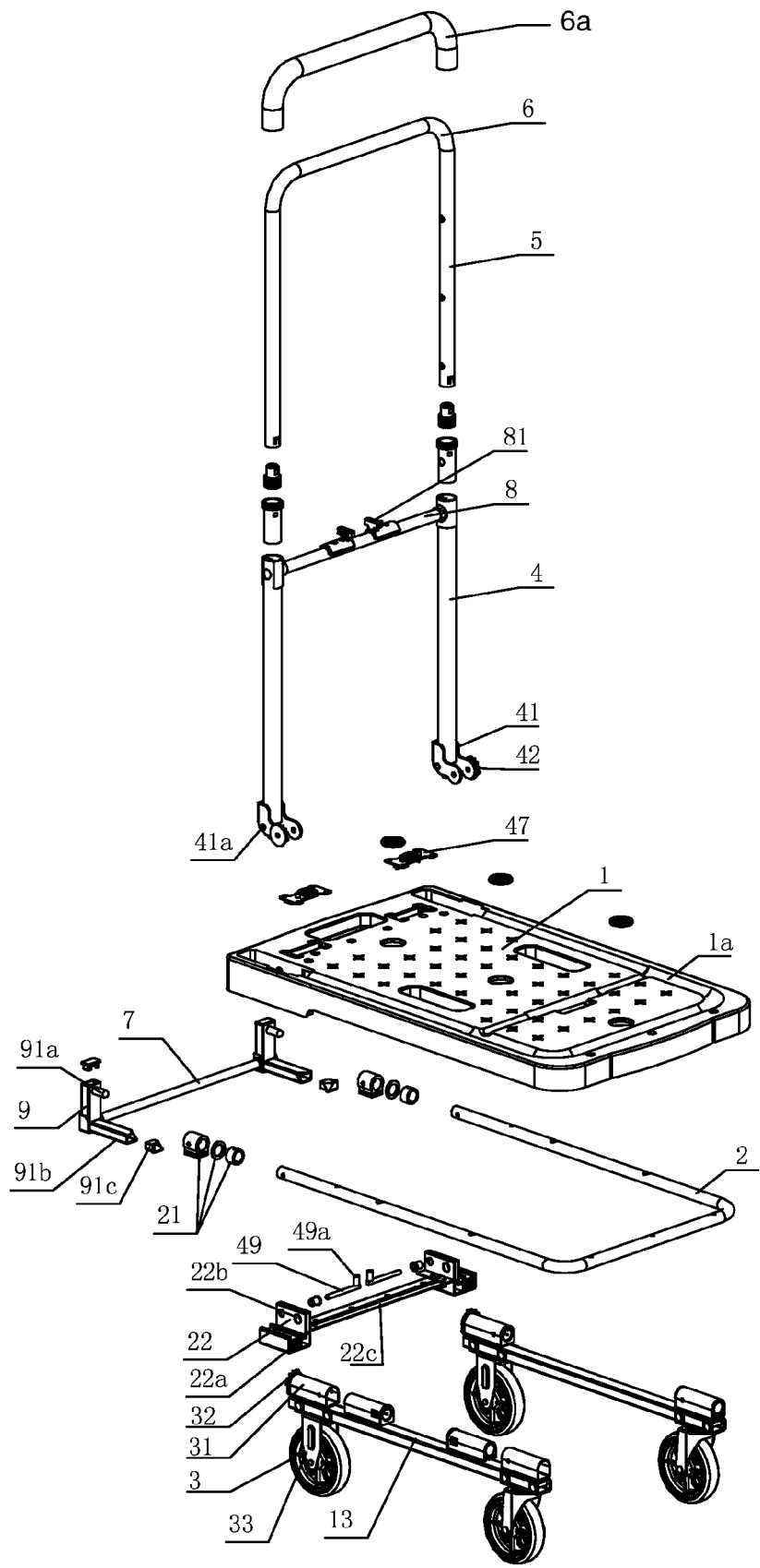
FIG. 22 is an exploded view of the flat platform cart.

The flat platform cart of the present embodiment mainly comprises a supporting section, a push-pull section and a caster section connected thereto by a linkage means, and an extension positioning means which enables the push-pull section and the caster section to be maintained in an extending state. As illustrated in FIGS. 1 and 22, the supporting section comprises a supporting frame 2, a load supporting platform 1 and supporting bases 22. The push-pull section comprises a handle 6, a soft plastic cover 6a covered on the handle 6, supporting bars 4, secondary supporting bars 5 which are telescopingly received in the supporting bars 4 respectively and a cross bar 8. The cross bar 8 is disposed with a lock (not shown in the drawings) and a lock reset spring 82 therein, and lock knobs 81 in connection with the lock. The caster section comprises casters 3, caster brackets 33, connecting bars 13 and caster sleeves 31. The casters 3 on the same side are connected via the connecting bar 13 to form a caster assembly. The caster sleeves 31 are engaged onto the supporting frame 2. The supporting frame is bended to form a U shape, the ends thereof are connected with the supporting bases 22 by means of a plurality of connecting parts 21. The supporting bases 22 are connected with a horizontal plate 22c. The horizontal plate 22c can strengthen the firmness of the supporting section, thereby enabling the flat platform cart to carry heavier weight.

Each supporting bar 4 is secured with a base bracket 41 at an end thereof. The base bracket 41 in combination with the supporting bar 4 form an L shape. Each base bracket 41 has a front end which is disposed with gears 42 at an outer side thereof. The gears 42 meshes with the gears 32 disposed on end faces of the caster sleeves to form a first coordinating part and a second coordinating part of the extending, collapsing and linkage means. The base brackets 41 are each connected onto the respective supporting bases 22 by means of an axle 42, so that when the push-pull section is collapsed, the intermeshing gears 42, 32 cause the caster assemblies to automatically collapse.

A vertical positioning means mainly comprises connecting means 9, upper latching pins 91a, lower latching pins 91b and a connecting bar 7. A horizontal positioning means mainly comprises locking pins 49, push buttons 52, knobs 46 and so on. The vertical positioning means and the horizontal positioning means are used for maintaining the extending state of a flat platform cart when being extended for work.

As the present invention is mainly a further improvement on the flat platform cart with collapsible casters disclosed in the China patent 200710146724.7, the parts of similar structures are not described in detail in the present embodiment whereas only the improved structures are described in detail.

Figure 4:
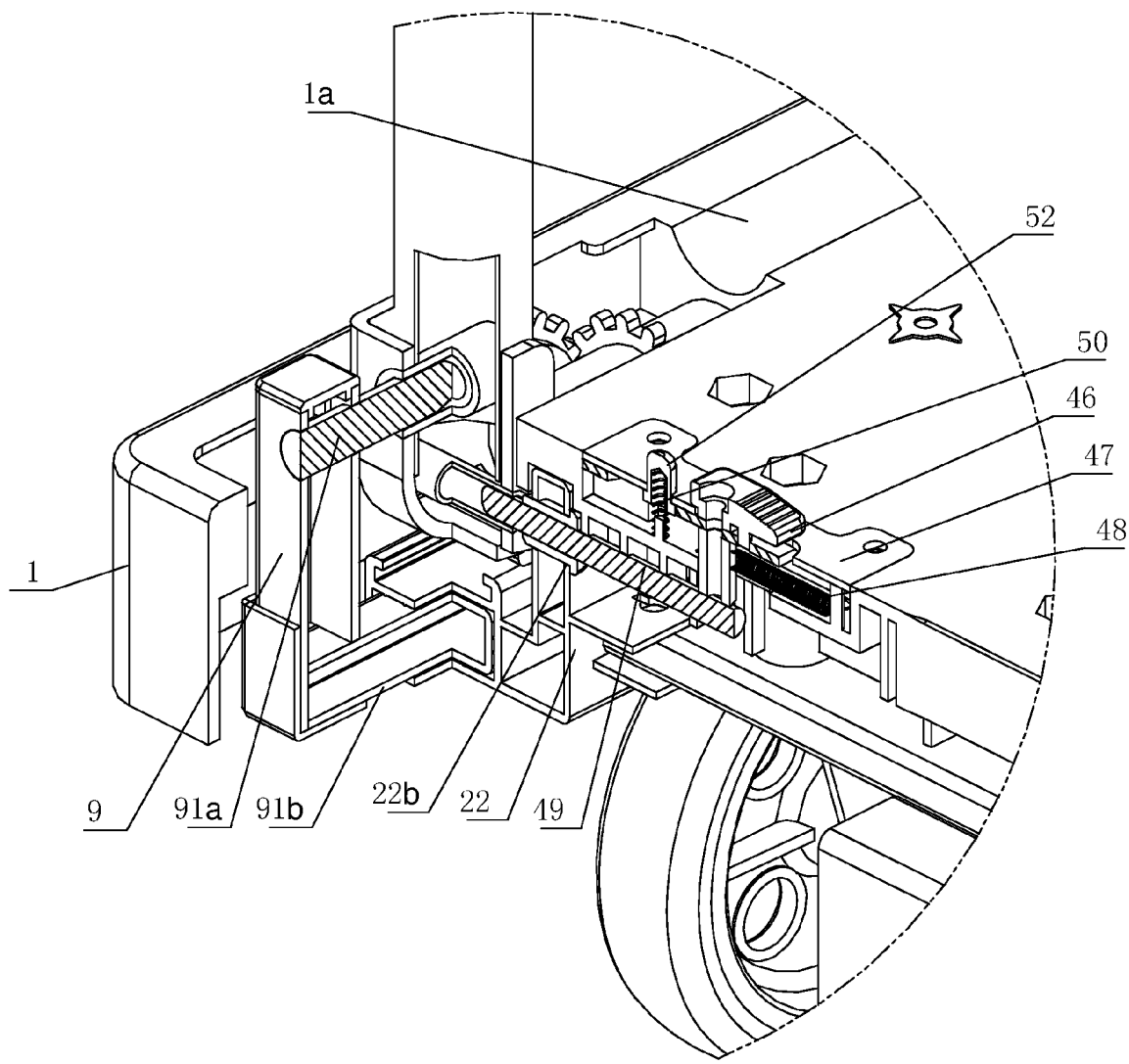
FIG. 4 is an enlarged view of the portion labeled "I" in FIG. 3.
Figure 5:
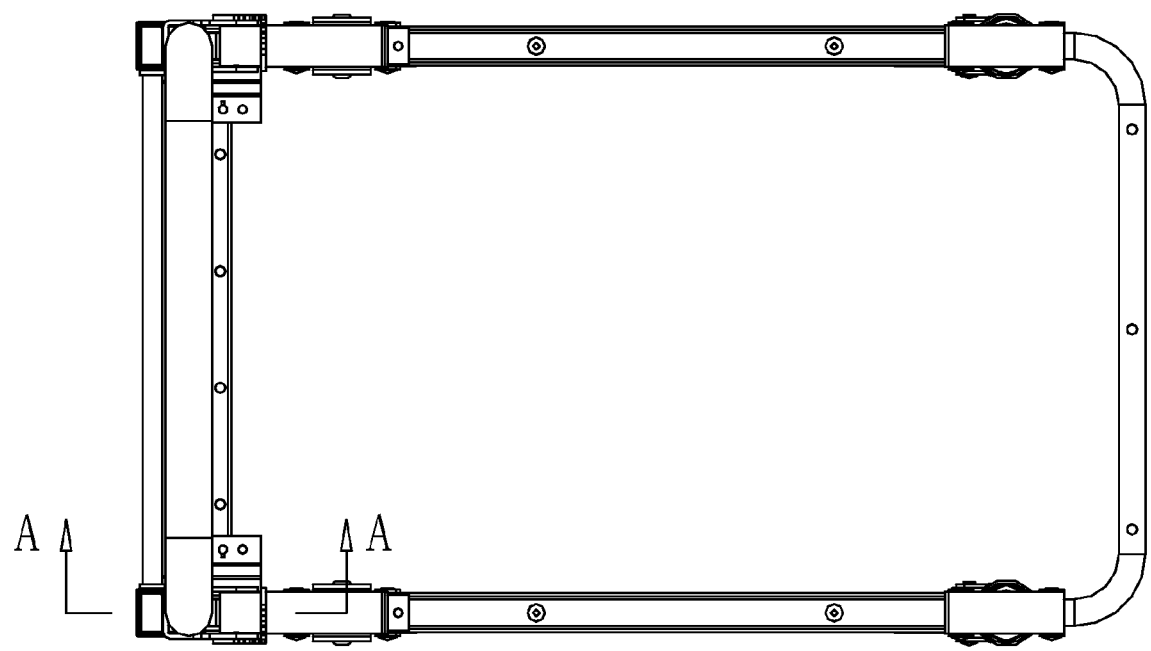
FIG. 5 is a top view of FIG. 1.
Figure 6:
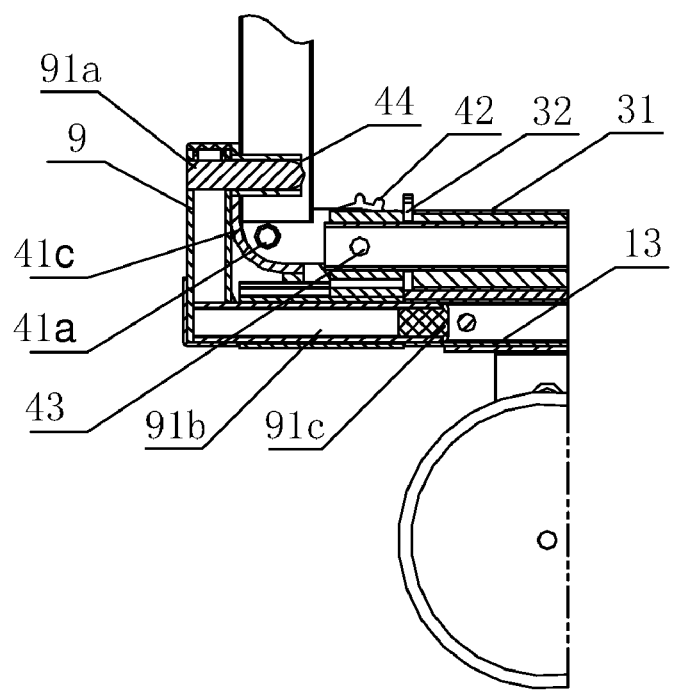
FIG. 6 is an enlarged cross-sectional view taken along the line A-A in FIG. 5.
Figure 7:
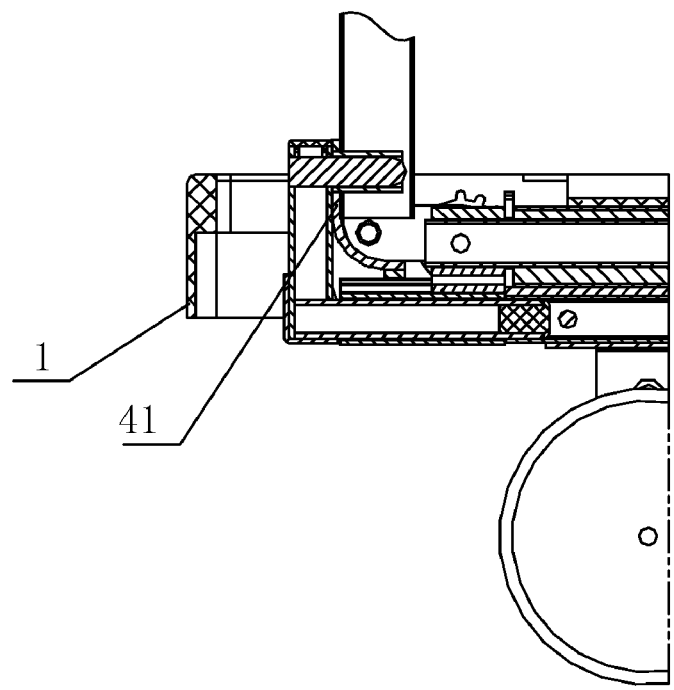
FIG. 7 is an enlarged cross-sectional view taken along the line B-B in FIG. 2.
Figure 12:
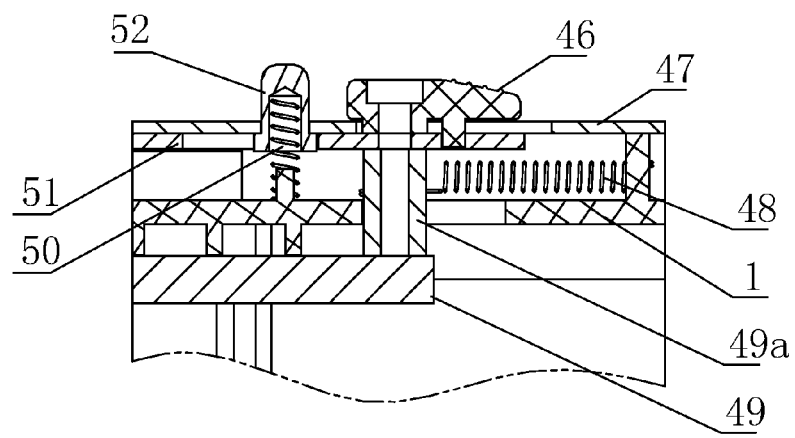
FIG. 12 is an enlarged partial cross-sectional view taken along the line C-C in FIG. 2.
Figure 13:
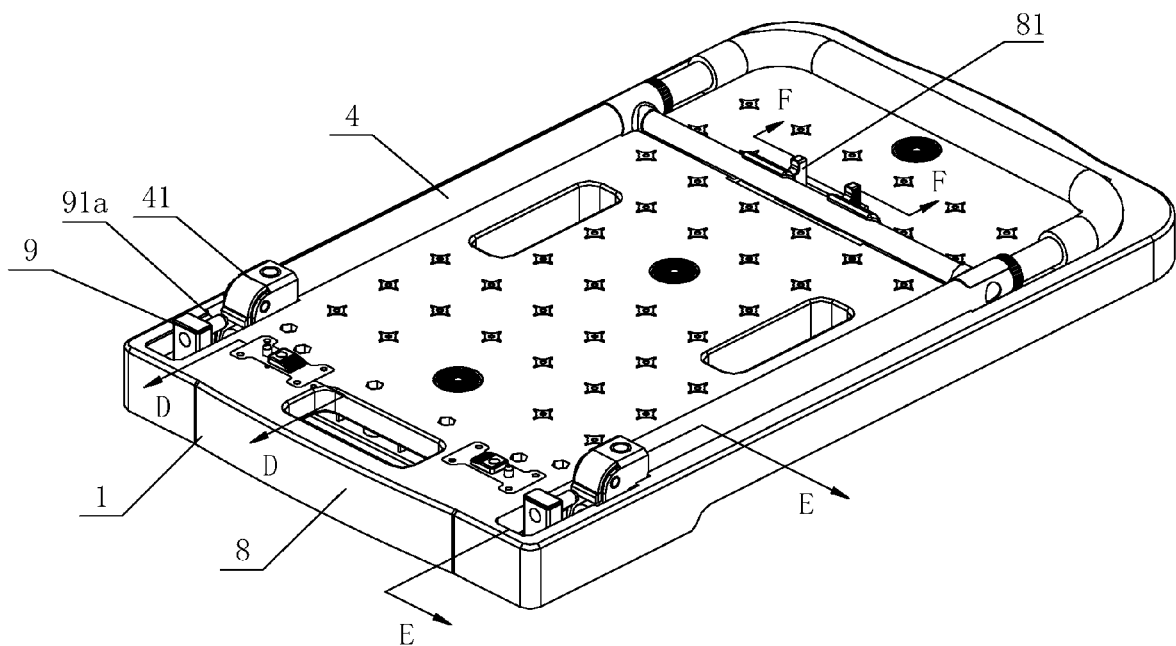
FIG. 13 is a perspective view of the flat platform cart in complete collapse.
Figure 14:
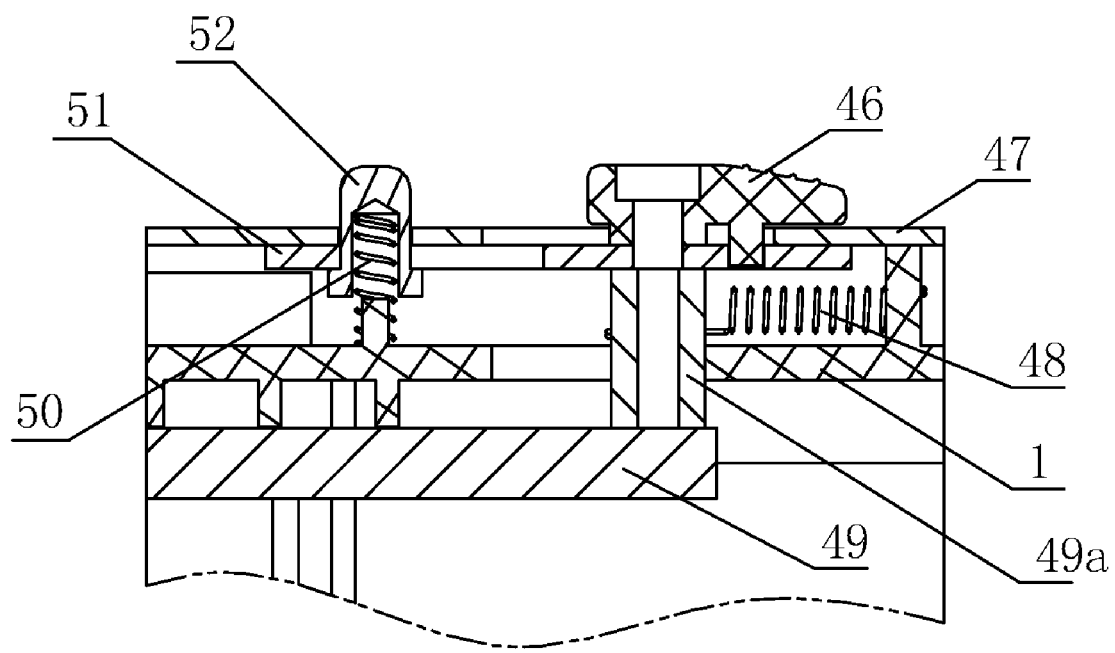
FIG. 14 is a cross-sectional view taken along the line D-D in FIG. 13.
Figure 18:
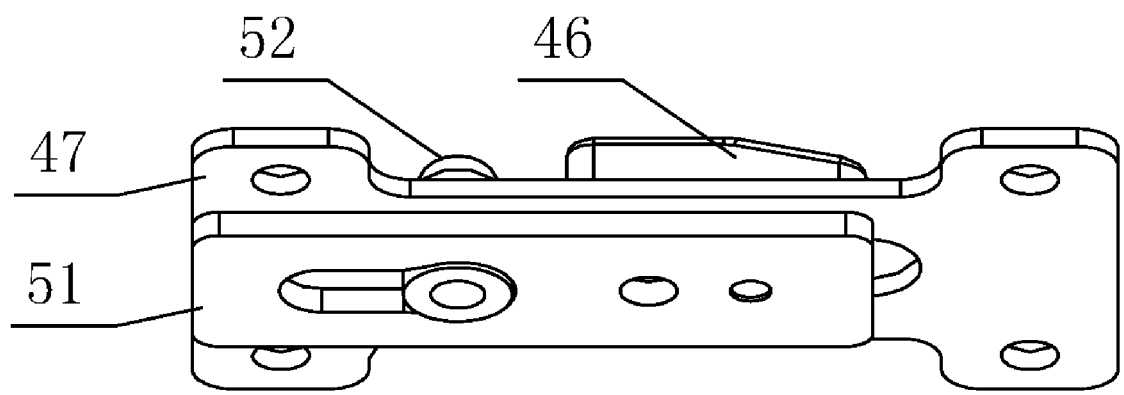
FIG. 18 is a perspective view of the assembly of the sliding plate, the covering plate, the press button and the knob.
Figure 19:
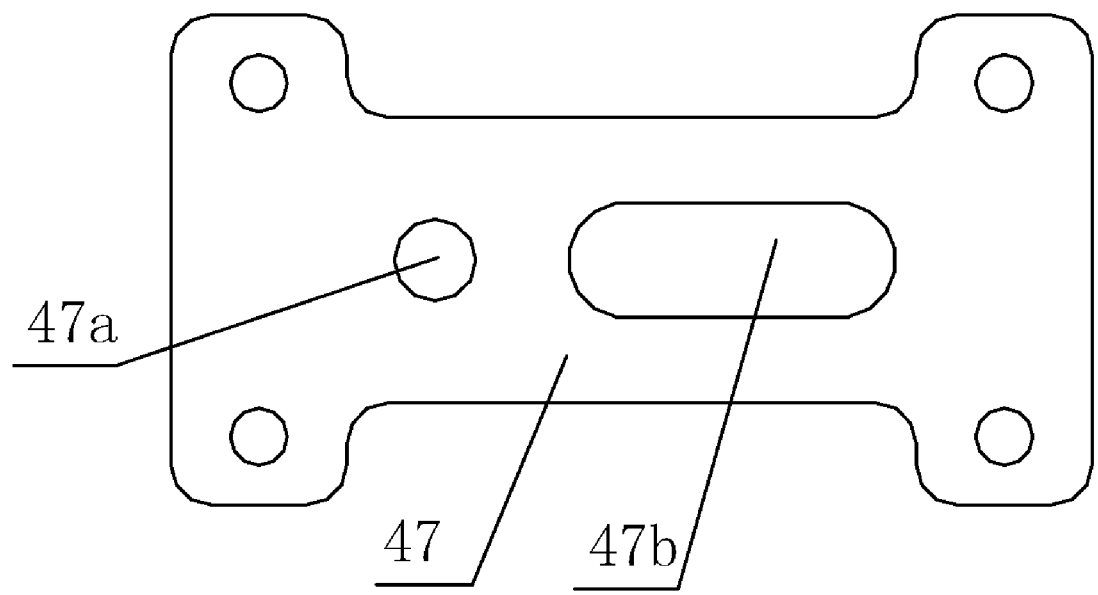
FIG. 19 is a front view of the covering plate.
Figure 20:
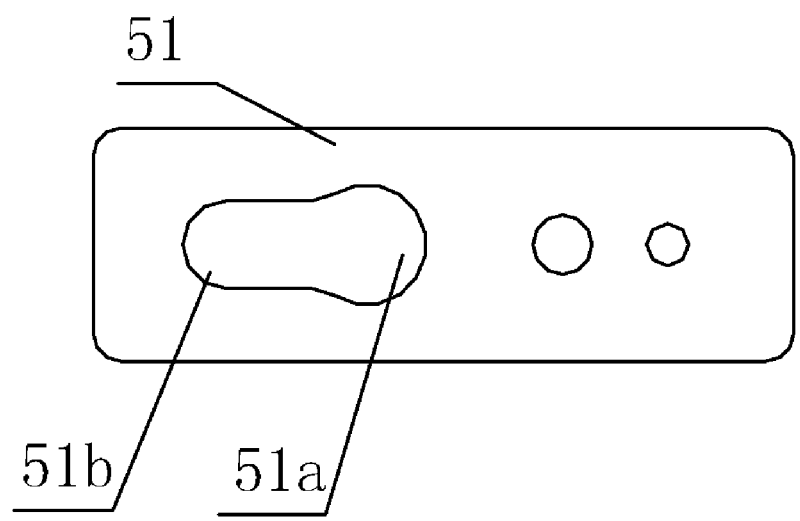
FIG. 20 is a front view of the sliding plate.
Figure 21:
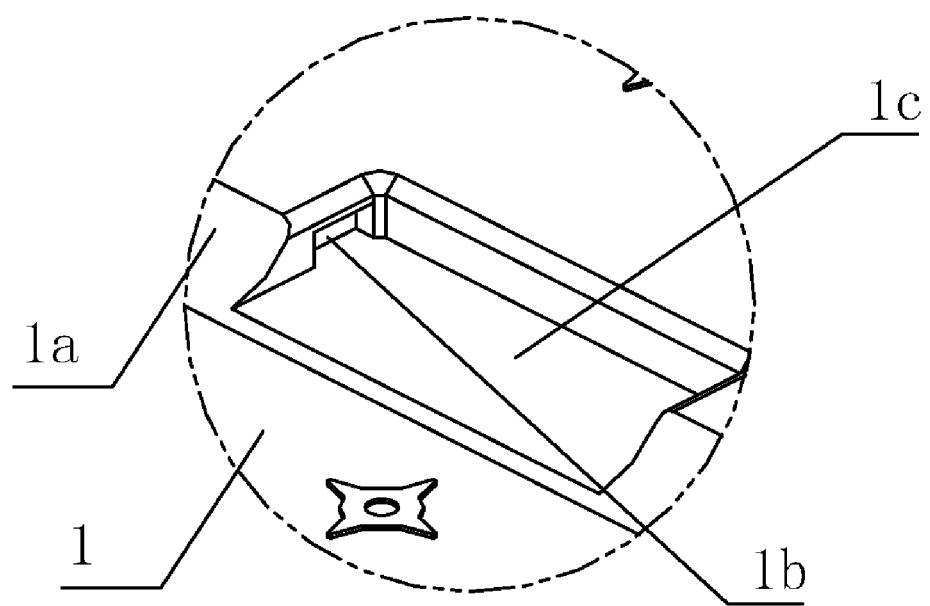
FIG. 21 is an enlarged view of the portion labeled "J" in FIG. 3.

As illustrated in FIGS. 2-4 and 12, the horizontal positioning means of the flat platform cart of the present embodiment comprises locking pins 49 which are horizontally slidable and disposed between the two supporting bars 4. Each base bracket 41 is disposed with a locking aperture 41a which corresponds to a first end of the locking pin 49. Each supporting base 22 is also disposed with a corresponding aperture 22b. Each aperture 22b is disposed with bushings therein. First ends of the locking pins 49 pass through the bushings in the apertures 22b and insert into the locking apertures 41a respectively. Second ends of the locking pins 49 are connected via connecting posts 49a to knobs 46 which drive the locking pins 49 to slide respectively. The connecting posts 49 are disposed with springs 48 thereon in parallel with the locking pins 49, the other ends of the springs 48 are secured on the mounting posts on the load supporting platform 1. As illustrated in FIGS. 4, 12 and 14, a sliding plate 51 parallel to the locking pin 49 is disposed above each locking pin 49; the sliding plate 51 and the locking pin 49 and the knob 46 are connected together. As illustrated in FIGS. 18, 19 and 20, each sliding plate 51 is disposed with a keyhole formed by a circular hole 51a in communication with an elongated hole 51b. A covering plate 47 secured on the load supporting platform 1 is disposed above each sliding plate 51. The load supporting platform 1 is disposed with press buttons 52 each having a circular base at positions corresponding to the keyholes. Each covering plate 47 is disposed with a through hole 47a for the press button 52 to pass through and a sliding slot 47b for the knob 46 to slide. Each press button 52 is disposed with a reset spring 50 at an underside thereof. The circular holes 51a of the keyholes and the circular bases of the press buttons 52 have substantially identical diameters, widths of the elongated holes 51b and diameters of the press buttons 52 correspond with each other.

When the flat platform cart is in a collapsing state, the first ends of the locking pins 49 abut against side faces of the base brackets 41, the springs 48 are compressed (as shown in 14), the circular bases of the press buttons 52 are pressed under the sliding plates 51 by the elongated holes 51b. When the push-pull section of the flat platform cart is rotationally extended in position, the front ends of the locking pins 49 are pressed into the locking apertures 41a by the springs 48, the locking pins 49 drives the sliding plates 51 to slide towards the supporting bars 4, when the circular holes 51a on the sliding plates 51 align with the circular bases of the press buttons 52, the press buttons 52 automatically elevate under the action of the reset springs 50 and the circular bases enter into the circular holes 51a of the sliding plates 51, thereby securing the sliding plates 51 relative to the locking pins 49 and achieving horizontal positioning of the push-pull section. When the push-pull system is required to be collapsed, the press buttons 51 are slightly pressed down, the knobs 46 are pushed in opposite directions, thereby causing the locking pins 49 to be disengaged from the locking apertures 41a, the horizontal positioning means can instantly be disenabled, simultaneously, the connecting bar 7 which is connected with the connecting means 9 is pulled, and the locking of the vertical positioning means is disenabled, the push-pull section can be rotationally collapsed around the axles 43.

As illustrated in FIGS. 1-11, the horizontal positioning means of the flat platform cart of the present embodiment comprises a left and a right connecting means 9 corresponding with the two supporting bars 4. The left and the right connecting means are disposed on the rear sides of the supporting bases 22. The connecting means 9 are each disposed with an upper latching pin 91a and a lower latching pin 91b which are in parallel to each other. The left and the right connecting means 9 are connected into an unitary body by means of the connecting bar 7. The two supporting bars 4 are respectively disposed with positioning apertures 44 corresponding to the upper latching pins 91a. At the same time, as the lower ends of the supporting bars 4 are securely connected with the base brackets 41, the base brackets 41 are also disposed with apertures 41b coaxial with the positioning apertures 44, the upper latching pins are simultaneously inserted into the apertures 41b and the positioning apertures 44. The lower latching pins 91b are in rectangular shape and correspond with the rectangular apertures 22a of the lower parts of the supporting bases 22 and the inner apertures 13a of the caster connecting bars 13. Besides, to ensure inserting accuracy, the front ends of the lower latching pins 91b are further disposed with guiding corners, the end faces are disposed with stoppers 91c.

Figure 8:
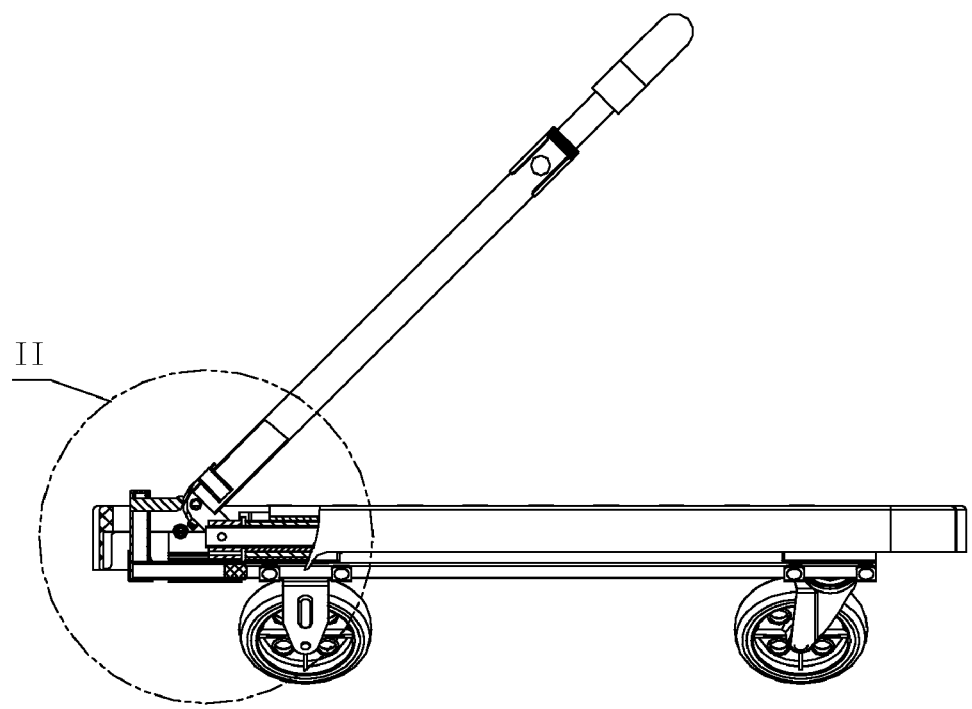
FIG. 8 is a partial cross-sectional view of the push-pull section as shown in FIG. 7 in the process of collapsing.
Figure 9:
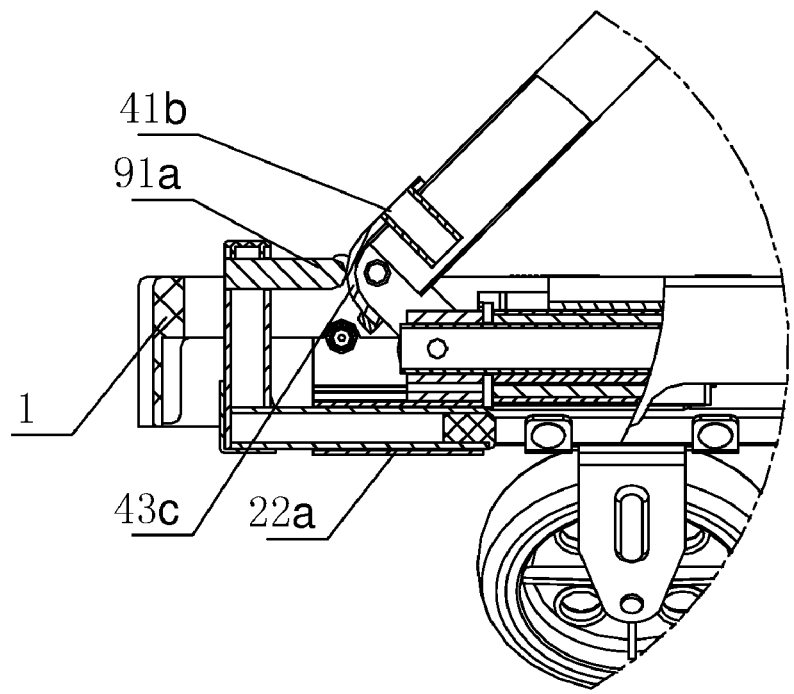
FIG. 9 is an enlarged view of the portion labeled "II" in FIG. 8.
Figure 10:
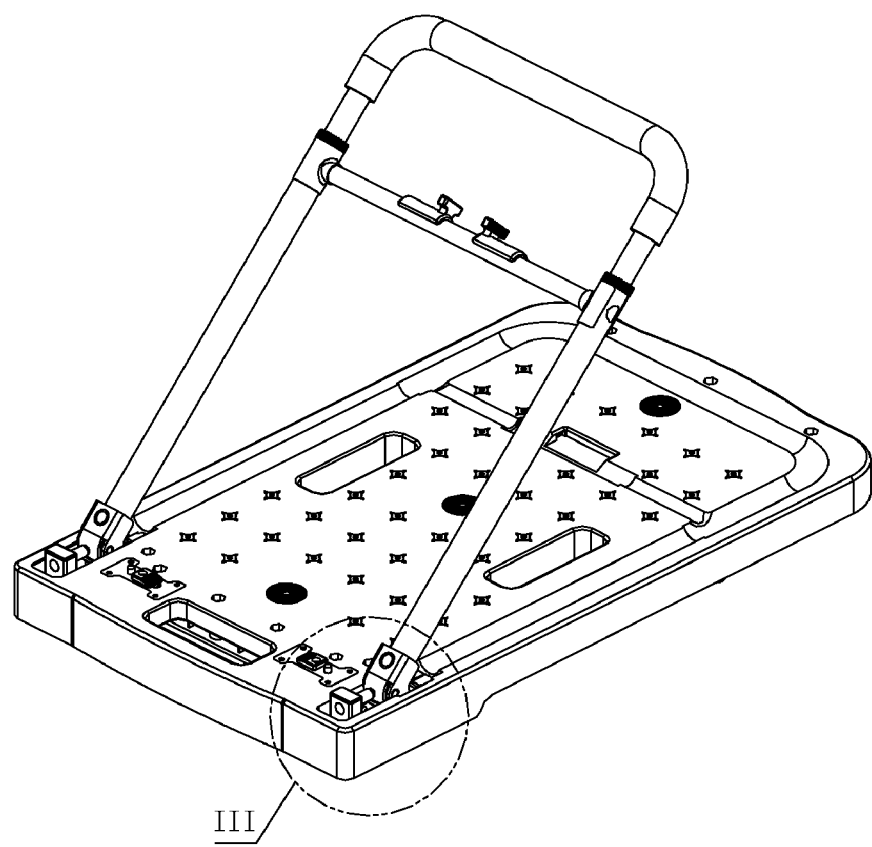
FIG. 10 is a perspective view of the push-pull section of the flat platform cart in the process of collapsing.
Figure 11:
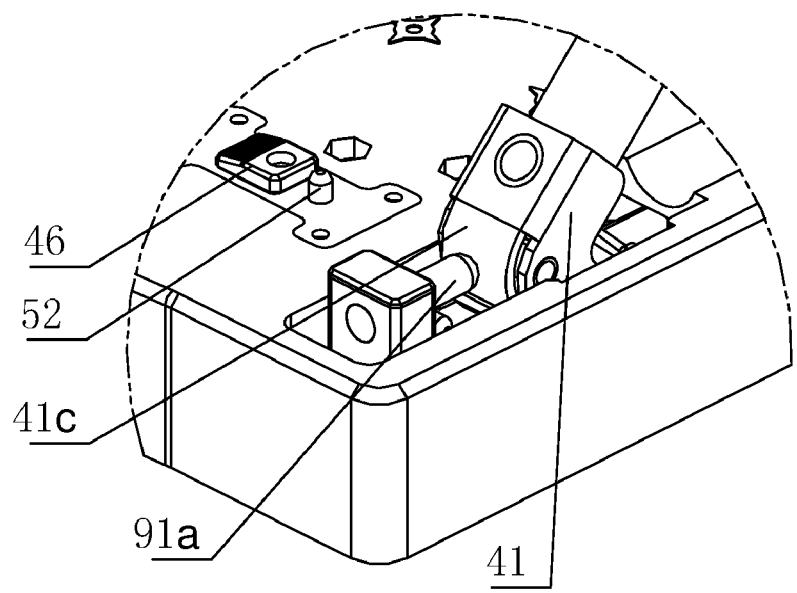
FIG. 11 is an enlarged view of the portion labeled "III" in FIG. 10.
Figure 15:
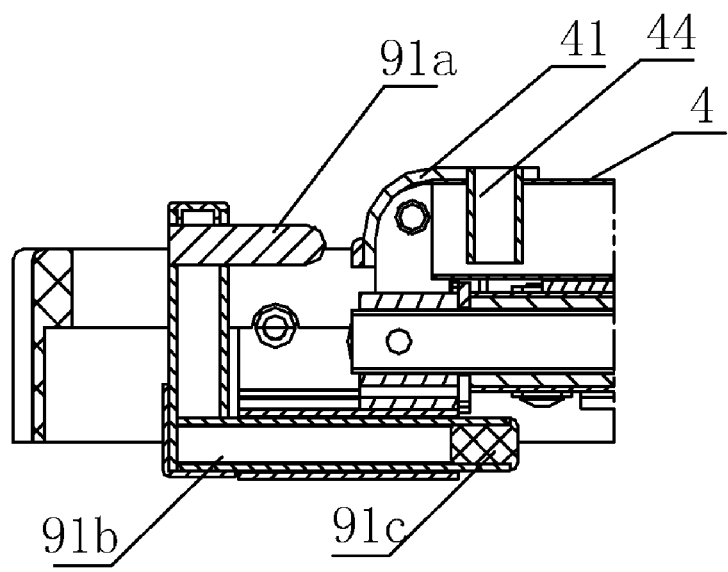
FIG. 15 is a cross-sectional view taken along the line E-E in FIG. 13.
Figure 16:
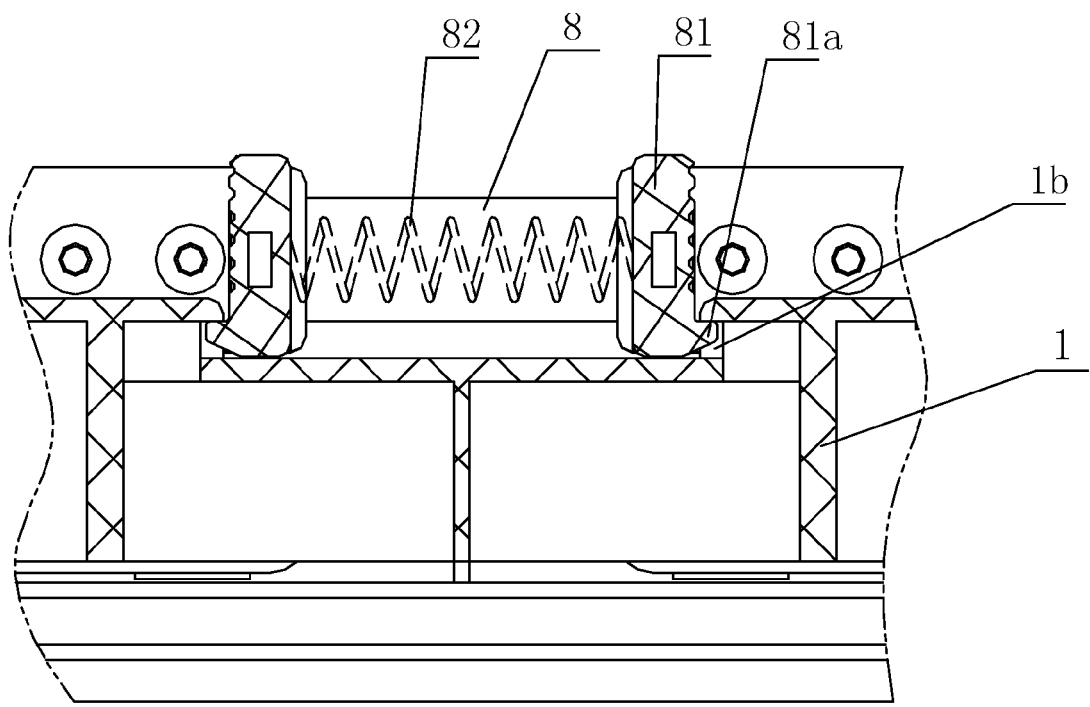
FIG. 16 is a cross-sectional view taken along the line F-F in FIG. 13.

Each base bracket 41 is disposed with a curved connecting transition face 41c between a rear side face and a lower end face thereof. Each base bracket 41 is connected onto the supporting base 22 on the rear side of the supporting frame 2 by an axle which passes through center of the gears 42. When the upper latching pins 91a are disengaged from the positioning apertures 44 on the supporting bars 4 and the apertures 41b on the base brackets 41, and the push-pull section is set to rotate around the axles 43 at the centers of the gears 42, the transition faces 41c of the base brackets 41 push the connecting means 9 rearward, causing the vertical positioning means to be maintained in an unlocking state (as illustrated in FIGS. 8, 9, and 15). As the present embodiment is simultaneously disposed with the horizontal positioning means and the vertical positioning means, the horizontal positioning means is also required to be unlocked before the push-pull section is set to rotate.

Figure 17:
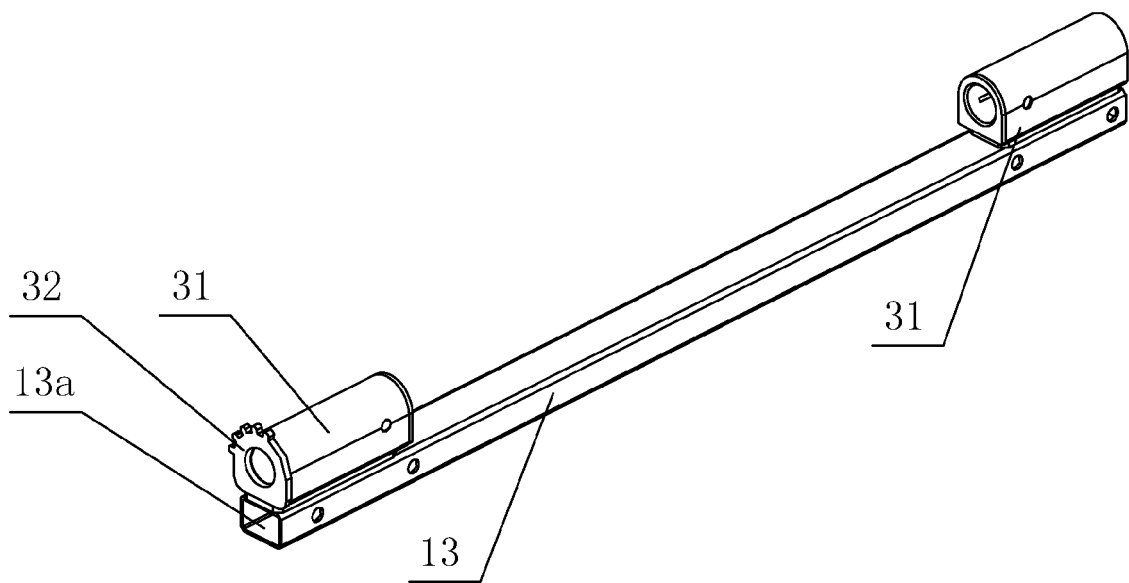
FIG. 17 is a perspective view of the connecting bar and the caster sleeves of the caster section of the flat platform cart.

As illustrated in FIGS. 17 and 22, the connecting bars 13 of the caster assembly adopt a squared tubular material with a dovetail slot on the top. The undersides of the caster sleeves 31 have inverted T-shaped mounting plates, the mounting plates are engaged in the dovetail slots of the connecting bars 13 and connected into unitary bodies. The gears 32 are secured on the front end faces of the caster sleeves 31. In this way, each caster assembly is an unitary body, therefore, only the caster sleeves 31 of the first casters 3 are disposed with the gears 32 and that can bring about the entire caster assembly rotating around the supporting frames 2 at consistent angles, thereby collapsing all the casters 3 at one-time.

As illustrated in FIGS. 3, 13, 16, 21 and 22, the cross bar 8 of the push-pull section is horizontally disposed with a lock and a lock reset spring 82 therein, the lock knobs 81 are connected with the lock. Simultaneously, the load supporting platform 1 is disposed with a groove 1a for receiving the push-pull section when it is collapsed, and an indented cavity 1c positioned corresponding to the lock knobs 81 on the cross bar. Two sides of the indented cavity 1c are each disposed with a locking slot 1b corresponding to a locking hook 81a on the lock knobs 81. The locking hooks 81a can be engaged into the locking slots 1b under the action of the lock reset spring 82, thereby enabling the push-pull section and the load supporting platform 1 to be maintained at a locked state.

What is claimed is:

1. A flat platform cart with collapsible casters, comprising a supporting section, a push-pull section and a caster section connected thereto by a linkage means, and an extension positioning means which enables the push-pull section and the caster section to be maintained in an extending state, wherein the supporting section comprises a supporting frame (2), supporting bases (22) and a load supporting platform (1) which are interconnected together, the push-pull section has two supporting bars (4) which are hinged onto the supporting bases (22) respectively by means of a base bracket (41); the caster section comprises casters (3), connecting bars (13) each connecting two or more casters (3) and caster sleeves (31), the caster sleeves are engaged onto the supporting frame (2), characterized in that the extension positioning means comprises a vertical positioning means which simultaneously locks the push-pull section and the caster section in position and a horizontal positioning means disposed between the load supporting platform (1) and the supporting bases (22) which horizontally locks the push-pull section in position; the vertical positioning means comprises a left and a right connecting means (9) which are disposed at a rear end of the load supporting platform (1) and correspond to the two supporting bars (4) respectively, each of the left and the right connecting means (9) is disposed with an upper latching pin (91a) and a lower latching pin (91b) which are in parallel to each other, the two supporting bars (4) and/or the base brackets (41) are respectively disposed with positioning apertures corresponding to the upper latching pins (91a), the lower latching pins (91b) are in rectangular shape, the connecting bars (13) of the caster section each has an inner wall which correspond to the lower latching pin (91b), the lower latching pins (91b) are latched into the connecting bars (13) of the caster section after passing through rectangular apertures (22a) of the supporting bases (22) respectively.

2. A flat platform cart with collapsible casters as in claim 1, wherein the horizontal positioning means comprises locking pins (49) which are horizontally slidable and disposed between the two supporting bars (4), each supporting bar (4)

and/or base bracket (41) is disposed with a locking aperture which corresponds to a first end of the locking pin (49), each locking pin is connected to a knob (46) which drives the locking pin to slide.

3. A flat platform art with collapsible casters as in claim 2, wherein a spring (48) coaxial or in parallel to the locking pin (49) is disposed at a second end of each of the locking pins, and an end of the spring (48) is connected with the load supporting platform (1).

4. A flat platform cart with collapsible casters as in claim 3, wherein a sliding plate parallel to the locking pin is disposed above each locking pin (49), the sliding plates are respectively connected with the knobs (46) of the locking pins (49), each sliding plate (51) is disposed with a keyhole formed by a circular hole (51*a*) in communication with an elongated hole (51*b*), the load supporting platform (1) is disposed with press buttons (52) each having a circular base at positions corresponding to the keyholes, each press button has an upper end which protrudes from an upper end face of the load supporting platform (1), each press button is disposed with a reset spring (50) at an underside thereof; the circular holes (51*a*) of the keyholes and the circular bases of the press buttons have substantially identical diameters, widths of the elongated holes (51*b*) and diameters of the press buttons (52) correspond with each other.

5. A flat platform art with collapsible casters as in claim 4, wherein a covering plate (47) secured on the load supporting platform (1) is disposed above each sliding plate (51), each covering plate (47) is disposed with a through hole (47*a*) for the press button (52) to pass through and a sliding slot (47*b*) for the knob (46) to slide.

6. A flat platform cart with collapsible casters as in claim 1, wherein each base bracket is disposed with a curved connecting transition face between a lower end face and a rear end face thereof, the base brackets (41) are each connected onto the respective supporting bases (22) by means of an axle, when the upper latching pins (91*a*) are disengaged from the positioning apertures on the supporting bars (4) and the base brackets (41), and the push-pull section is set to pivotally rotate around the axles, the transition faces (41*c*) of the base brackets (41) push the connecting means (9) rearward and thereby maintaining the vertical positioning means in an unlocking state.

7. A flat platform cart with collapsible casters as in claim 6, wherein the linkage means comprises a first coordinating part and a second coordinating part; the first coordinating part and the second coordinating part are intermeshing gears (42, 43) perpendicular to each other; the gears (42) of the first coordinating part are disposed on the base brackets (41) respectively, the gears (43) of the second coordinating part are disposed on end faces of the caster sleeves (31) respectively.

8. A flat platform cart with collapsible casters as in claim 2, wherein the push-pull section comprises a cross bar (8) horizontally connected with the supporting bars (4), a support bars extension and retraction lock and a lock reset spring (82) disposed in the cross bar (8), and lock knobs (81) disposed on the cross bar (8) in connection with the lock.

9. A flat platform cart with collapsible casters as in claim 8, wherein the load supporting platform (1) is disposed with locking slots (1*b*) at positions corresponding to the lock knobs (81) on the cross bar (81) for maintaining the push-pull section and the load supporting platform (1) at a locked state; the lock knobs (81) each has a lock hook (81*a*) on an outer side face thereof, under action of the lock reset spring (82), the lock hooks (81*a*) are engaged in the locking slots (1*b*) respectively.

\* \* \* \* \*